UNITED STATES PATENT OFFICE 2,616,930

CYCLOALKYL AROMATIC ETHERS OF POLYALKYLENE GLYCOLS

Louis Schmerling, Riverside, Ill., assignor to Universal Oil Products Company, Chicago, Ill., a corporation of Delaware No Drawing. Application September 27, 1950, Serial No. 187,159

17 Claims. (Cl. 260—613)

This invention relates to a novel class of ethers having surface active properties and to a process for their manufacture which comprises condensing an aromatic compound containing a nuclear hydroxyl substituent with an alkylbicycloheptene to form an alkylbicycloheptylaryl compound and reacting the latter compound with a polyalkylene glycol at etherifying conditions to form the present ether-type surface active compounds.

It is known in the art that certain polyalkylene glycol ethers of alkylphenols are effective nonionic detergents in aqueous media. This invention concerns a series of novel detergent products comprising certain alkoxy derivatives of alkylbicycloheptyl aromatic hydrocarbons having the following general empirical structure:

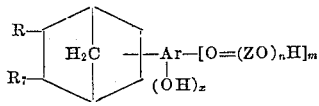

in which Ar is a polyvalent aryl hydrocarbon group, R and R' are selected from the group consisting of hydrogen and alkyl, not more than one of said R and R' groups being an alkyl radical containing not more than about 12 carbon atoms per group and the other not more than about 4 carbon atoms per group, Z is a divalent alkylene group containing from 2 to 5 carbon atoms per group, $n$ is a whole number having a value of from about 5 to about 150, preferably from about 10 to about 40, representing the number of alkylene glycol units per alkoxy group of said detergent product, $m$ is a small whole number having a value of 1 to 2, and $x$ is a numeral having a value of from zero to $2-m$ when Ar is benzenoid and to $5-m$ when Ar is polycyclic.

These compounds may be formed by the process which comprises the following sequence of steps: (1) alkylating an hydroxy aromatic compound containing a displaceable nuclear hydrogen atom with an alkylbicycloheptene alkylating agent in the presence of an alkylation catalyst at condensation reaction conditions and (2) reacting the resulting alkylate with an oxyalkylene compound capable of producing a polyalkylene glycol ether on condensation with a phenolic hydroxyl group to thereby form said alkoxy derivative of the bicycloheptylhydroxyaromatic compound.

A more specific embodiment of the invention relates to a process for the production of a detergent which comprises alkylating phenol in the presence of sulfuric acid containing less than 10 per cent by weight of water with an alkylbicyclo-[2.2.1]-2-heptene and reacting the resulting alkylate with a polyethylene glycol containing from about 10 to about 40 ethylene oxide units per molecule.

Other embodiments of the invention relating to specific charging stocks and methods for effecting the present process will be referred to in greater detail in the following further description of the invention.

Hydroxy aromatic compounds, one of the primary charging stocks to the alkylation stage of the present process in which the intermediate bicycloheptyl alkylate of said hydroxy aromatic compounds are formed, are characterized generally as containing a nuclearly replaceable hydrogen atom on the aryl nucleus, and may contain multiple hydroxyl groups as nuclear aryl substituents. The hydroxyaromatic compounds herein contemplated as reactants in the alkylation reaction of the process may also contain other diverse nuclear substituents such as halo, nitro, amino and short chain alkyl groups, the total number of such nuclear substituents other than hydrogen generally not exceeding about 3 per molecule for the benzenoid aromatic series and not more than about 6 for the polynuclear aryl series of compounds. Typical specific members of such hydroxyaromatic compounds utilizable in the present process as charging stocks to the alkylation reaction of the process include phenol and its nuclearly substituted derivatives, such as the alkyl phenols, including the cresols (ortho-, meta-, and para-cresols), and higher alkyl homologs, the polyhydroxy aromatic compounds such as hydroquinone, catechol, o-, m-, and p-dihydroxydiphenyl compounds, the hydroxynaphthalenes, such as α- and β-naphthol and other alkylatable hydroxyaromatic compounds.

The bicycloheptene class of compounds comprising the present alkylating agents may be produced by any suitable means, as, for example, by the general synthetic method shown in the Charles L. Thomas Patent No. 2,340,908 in which process said bicycloheptene hydrocarbon is formed by condensing an olefinic hydrocarbon with a cycloalkadiene at specified reaction conditions. In order to form a bicyclo olefinic hydrocarbon alkylating agent which will produce a desirable surface active agent when the bicycloheptene alkylating agent is condensed with an hydroxy aromatic compound and the resulting alkylate converted to a surface active agent by condensing the same with a polyalkylene glycol or alkylene oxide in accordance with the present process, the mono-olefin condensed with the cycloalkadiene preferably contains at least three carbon atoms per molecule, such as propylene, butene-1, butene-2, pentene, the various isomeric $C_6$, $C_7$, and $C_8$ olefinic hydrocarbons and particularly n-hexene, n-heptene, n-octene and higher homologs containing up to about 14 carbon atoms per molecule. The resulting alkylbicycloheptenes thereby contain an alkyl substituent on the bicycloheptyl portion of the molecule which in the case of utilizing propylene in the initial condensation reaction is methyl and for amylene, is propyl. The preferred olefinic hydrocarbons for the preparation of the bicycloheptene alkylating agent by condensation with a cycloalkadiene hydrocarbon contain at least five carbon atoms, thereby yielding a condensation product containing an alkyl group having at least three carbon atoms per group, the latter alkylbicycloheptenes producing the preferred alkylates for detergent production. In order to form compounds of the preferred structure as above specified, the olefinic hydrocarbon reactant utilized in the condensation reaction has the following structure:

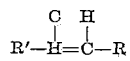

in which R is an alkyl group containing at least 3 and not more than about 12 carbon atoms per group and R' is hydrogen or alkyl containing not more than about 4 atoms per group. The preferred olefinic reactants are normal alkenes in which R is hydrogen. Further preference is accorded olefins of the above structure containing from about 8 to about 12 carbon atoms per molecule because these yield the most desirable detergents upon subsequent alkylation of the hydroxyaromatic reactant with the alkylbicyclicheptene alkylating agent and condensing the alkylate product with an alkylene oxide or polyalkylene glycol. The most economical alkylbicycloalkene alkylating agents are formed from cyclopentadiene as the source of the cycloalkadiene reactant, although various alkylbicyclo-octenes, formed by condensing cyclohexadiene with an olefinic hydrocarbon, may also be utilized as reactants herein.

The condensation of the hydroxyaromatic compound and the bicycloheptene alkylating agent is effected in the presence of an alkylation catalyst selected from the relatively large group of compounds known by the general description as "acid-acting" inorganic compounds or complexes thereof with certain types of organic compounds as hereinafter described. Typical representative alkylation catalysts of this group suitable for promoting the condensation of the hydroxyaromatic reactant and the alkylbicycloheptene alkylating agent are such substances as sulfuric acid, preferably containing at least 85% to about 100% of the acid, hydrofluoric acid, containing less than 10% and preferably, less than 5% by weight of water, phosphoric acid, preferably pyrophosphoric acid, boron trifluoride and the Friedel-Crafts type metal halides, such as aluminum chloride, aluminum bromide, zinc chloride, ferric chloride, etc., either as the anhydrous salts or as certain molecular addition complexes with oxygen-containing organic compounds. The latter include such classes of compounds as the alcohols, aliphatic ethers, carboxylic acid esters, ketones, nitro-substituted aliphatic compounds, etc. Typical of the latter complexes of Friedel-Crafts metal halides with aliphatic organic oxygen-containing compounds which have an activity level somewhat less than the unmodified Friedel-Crafts metal halides are such complexes as an aluminum chloride mono-etherate, an aluminum bromide mono-ethanolate, a boron trifluoride mono-etherate, etc. The condensation of the alkylbicycloheptene and hydroxyaromatic compound is effected in the presence of an acid-acting catalyst selected from the above group at temperatures of from about $-10°$ to about 50° C., particularly when a relatively active catalyst of the above group, such as sulfuric acid containing from about 95 to 100% of the acid, or an anhydrous aluminum halide is utilized in the reaction, while somewhat higher temperatures of from about 30° to about 300° C. may be utilized when the alkylation is effected in the presence of a catalyst which has a less deep-seated effect on the present reactants, such as a less active Friedel-Crafts metal halide, typified, for example, by zinc chloride.

Following the completion of the alkylation reaction, usually after a period of from about ½ to about 5 hours or more, a used catalyst phase generally separates from the alkylate product of the reaction as a sludge-like material which may be removed from the alkylate product or upper layer of the reaction mixture, for example, by simple decantation. The desired alkylate utilized as charging stock to the etherification or second stage of the present process is generally a specific boiling range fraction of the entire alkylate product selected on the basis of providing the most desirable wetting agent upon subsequent reaction with an alkylene oxide or polyalkylene glycol.

The condensation of cyclopentadiene with a mono-olefinic hydrocarbon yields a bicycloheptene as one product of the condensation reaction, formed in accordance with the following empirical equation:

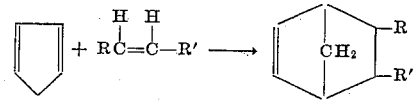

wherein R and R' is hydrogen or alkyl and not more than one of said R and R' groups is an alkyl radical containing not more than 12 carbon atoms per radical. The resulting bicycloheptene when reacted with an hydroxyaromatic compound in the presence of an alkylation catalyst, yields an alkylate in accordance with the mechanism indicated in the following equation for the reaction involving phenol as the hydroxyaromatic reactant:

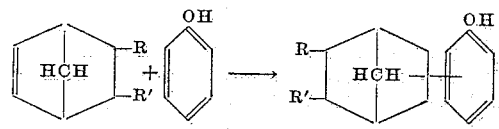

The present products, comprising the polyalkylene glycol ethers of the above-mentioned bicycloheptyl-phenolic compounds preferably have an R substituent selected from the alkyl groups containing at least 3 and not more than about 12 carbon atoms per group and an R' substituent selected from the group consisting of hydrogen or an alkyl group containing not more than about 4 carbon atoms per group. Further preference is for compounds of the above structure in which R' is hydrogen, formed, for example, when cyclopentadiene is condensed with a 1-olefin in the preparation of the initial bicycloheptene.

It is to be emphasized, however, that all of the various products formed by the variety of reactant species indicated above are not necessarily of equivalent effectiveness nor do the proposed structural formulae necessarily represent the ultimate or exclusive products of the reaction. Neither is it intended to limit the scope of the invention in accordance with the specific mechanism proposed.

The etherification reaction of the present process in which the phenolic hydroxyl group or groups of the bicycloheptyl alkylate of the hydroxyaromatic compound is condensed with a polyalkylene glycol or alkylene oxide, is directed so as to obtain a product having maximum detersive properties, determined at the point of balance between the hydrophobic and hydrophilic groups on the molecule of detergent. At the latter critical point at which the hydrophobic group of the individual detergent molecules in solution (the hydrocarbon portion of the molecule) balance the hydrophilic groups (the water-solubilizing polyalkylene oxide residue of the ether linkage attached to the aryl nucleus) the molecules of detergent are capable of orientation in a liquid solvent to form micelle aggregates. When the concentration of detergent in solution is sufficient to form complete micelles, the point of maximum detergency for the particular compound in solution is reached. The chain length of the polyoxyalkylene group required to form products of optimum detergency in which the critical balance point is realized is different for each product, determined principally by the chain length of the alkyl substituent on the bicycloheptyl group of the detergent molecule. Thus, of the various species of alternative reactants herein provided, the selection of a suitable polyalkylene glycol or alkylene oxide for condensation with the alkylbicycloheptyl hydroxyaromatic compound is a matter of trial to determine the point at which optimum detergency is observed. Of the polyalkylene glycols useful in the present process, the polyethylene, polypropylene, polybutylene and polyamylene glycols have been observed to produce suitable detergent products. If the empirical formula: $HO(ZO)_nH$ represents utilizable glycols in the present process, Z is an alkylene group containing from 2 to 5 carbon atoms per group and $n$ has a value of from about 5 to about 150, preferably from about 10 to about 40. For the polyethylene glycols, the preferred members of this series have molecular weights of from about 200 to about 4,000, and preferably from about 300 to about 3,000; utilizable poly-propylene glycols are selected from the polymers having molecular weights of from about 200 to about 6,000, preferably from about 300 to about 3,000; the polybutylene glycols are selected from the polymers having molecular weights of from about 300 to about 8,000, preferably from about 400 to about 4,000; for the poly-amylene glycol series, the preferred polymers have molecular weights of from about 400 to about 10,000. The monoethers and mono-esters of the above polyoxyalkylene glycols may also be used in the process.

The condensation of the alkylbicycloheptyl alkylate of the hydroxyaromatic compound with the alkylene oxide is effected thermally by heating a mixture of the alkylene oxide and alkylate reactants at a temperature of from about 50° to about 150° C., generally at a super-atmospheric pressure sufficient to maintain substantially liquid phase conditions in the reactor and until the chain length of the polyoxyalkylene group is sufficient to impart the desired degree of detergency to the ultimate condensation product. The reaction period and the ratio of alkylene oxide to bicycloheptylphenol are critical process variables which determine the ultimate chain length of the polyoxyalkylene radical comprising the ether linkage of the product. The polyalkylene glycol ethers may also be prepared by treating the phenolic compound with polyalkylene glycol under similar conditions of temperature and pressure, or, the reaction may be carried out in the presence of a catalyst such as sulfuric acid, benzensulfonic acid, zinc chloride, etc.

It is to be noted that the physical properties of the condensation products obtained in the present process, and particularly the melting points and solubility in aqueous solvents, are determined by the size of the hydrocarbon portion of the detergent molecule, and particularly upon the chain length of the alkylene group of the polyalkylene oxide chain and the number of oxyalkylene groups appearing in the latter chain. Thus, a polyoxyalkylene group containing a long chain carbon skeleton (e. g., amylene as the alkylene group) relative to the number of water-solubilizing oxy groups in the chain is generally substantially insoluble in water, but relatively more soluble in organic solvents such as oils. Therefore, such products have little utility as detergents for aqueous systems, but may be utilized as a detergent in organic liquids, such as the detergent component of a lubricating oil or cutting oil composition, or as an emulsifying agent. On the other hand, a polyoxyalkylene radical containing a relatively short carbon atom skeleton (e. g. ethylene as the recurring alkylene group) relative to each water solubilizing oxy group is generally soluble in water and when the chain length of the hydrophilic polyoxyalkylene ether group attached to the aryl nucleus of the product is of sufficient chain length and contains a sufficient number of said water-solubilizing groups, the resulting product is an effective detergent for aqueous systems.

The products of this invention vary in physical form from relatively viscous liquids (particularly in the case of the polyoxyethylene ethers of relatively low molecular weight) to semi-solid pastes and wax-like materials having broad melting temperatures, generally below the boiling point of water. The products, being substantially neutral, non-ionic organic compounds, may be composited with other non-ionic detergents to form detergent compositions having particular application as skin-washing aids, especially for persons whose skin is alkali-sensitive. The products may also be composited with anionic or cationic detergents, as for example, a composition consisting of a fatty acid "soap" and the present product in any desirable proportion of the components. Such compositions may be prepared particularly from the waxy or paste-like products of this invention. The composition product in most instances possesses the desirable "feel" and mucilaginous qualities of soap, not necessarily characteristic of the present detergent product individually. Although such mixtures are generally compatible in all proportions to provide a homogeneous composition, it is preferred to maintain a predominant proportion of the present polyoxyalkylene ether in the mixture, from about 50% to about 95% by weight of the mixture.

The preferred compounds of the present series of products, represented structurally by the empirical formula

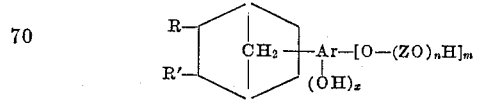

are compounds in which Ar represents a phenyl nucleus, Z is an ethylene group, $m$ has a value of one, $x$ is zero or 1, $n$ has a value of from about 10 to about 40, R' is hydrogen and R is an alkyl substituent containing from 6 to 9 carbon atoms per group.

The present invention is further illustrated with respect to specific embodiments thereof in the following examples. The examples illustrate preferred reactants, preferred process conditions, etc. and are not intended to define the limits of the present broad disclosure.

EXAMPLE I

An alkylbicycloheptene alkylating agent comprising 5-hexyl-bicyclo-[2.2.1]-2-heptene is formed by the condensation of cyclopentadiene with 1-octene at a temperature of about 200° C. and at a pressure of approximately 75 atmospheres. A solution of 48 grams of said hexylbicycloheptene and 96 grams of phenol is added during 0.5 hour to a well-stirred mixture of 60 grams of 96% sulfuric acid and 192 grams of phenol at 0° C. Stirring is continued for an additional 0.5 hour at 0° C., the catalyst layer (68 grams) separated from the organic layer, and the latter washed with a 10% aqueous solution of sodium chloride. The separated product is dried, and fractionally distilled at 2 mm. Hg pressure. The desired alkylate product is formed in a yield of about 50% of theoretical and comprises hexylbicycloheptylphenol.

A series of polyethylene glycol ethers of the above alkylate are prepared from polyethylene glycol fractions having average molecular weights of 146, 200, 800, 1000, 1540, 3000, and 6000 respectively by heating a vigorously stirred mixture of the particular glycol fraction and the above phenol alkylate and a catalytic amount of sulfuric acid at a temperature of 85° C. for 6 hours, utilizing equimolecular proportions of the phenol alkylate and polyethylene glycol fraction, based upon the above average molecular weights of the glycol. The resulting product contains substantially no free phenol alkylate or polyethylene glycol.

The series of ethylene glycol ethers prepared as indicated above from the glycols of varying molecular weights in admixture with 1.5:1 proportions by weight of sodium sulfate are tested for their detergency in a series of Standard Launderometer test procedures, using a sodium dodecylbenzene sulfonate-sodium sulfate composition (also containing 1.5 proportions by weight of sodium sulfate) as the standard for comparison. The following Table 1 indicates the results of these tests:

*Table 1*

| Concentration of Detergent composition in aqueous solution, percent by weight | 0.05 | 0.15 | 0.30 |
|---|---|---|---|
| Molecular weight of polyethylene glycol utilized in preparation of test sample of detergent | Detergency,[1] compared to Sodium-dodecylbenzene sulfonate—Na²SO⁴ composition | | |
| 146 | 51 | 52 | 50 |
| 200 | 64 | 67 | 63 |
| 800 | 89 | 91 | 90 |
| 1,000 | 110 | 110 | 100 |
| 1,540 | 134 | 136 | 131 |
| 3,000 | 114 | 120 | 125 |
| 6,000 | 103 | 105 | 118 |

[1] Detergency=100× (increase in reflectance of soiled cotton swatch after laundering in test detergent) / (increase in reflectance of soiled cotton swatch after laundering in SDBS detergent)

EXAMPLE II 5-propylbicyclo-[2.2.1]-2-heptene is formed by the condensation of cyclopentadiene with pentene-1 at a temperature of about 220° C. and at a pressure of about 100 atmospheres. A solution of 129 grams of the resulting propylbicycloheptene and 216 grams of o-cresol is added over a period of 1 hour to a well-stirred mixture of 120 grams of 98.5% sulfuric acid and 324 grams of o-cresol at 0° C., maintained at the latter temperature by a salt-ice bath surrounding the reactor. Stirring is continued for an additional 0.5 hour at 0° C., following which the catalyst layer (used acid) is separated from the upper organic layer, and washed with a 10% aqueous sodium chloride solution. The dried product is fractionally distilled at 10 mm. Hg pressure to separate the desired alkylate, the latter being recovered in a yield of approximately 50% of theoretical.

A series of polyethylene glycol ethers of the above alkylate are prepared in accordance with the procedure indicated in Example I, above, the ether products in composition with sodium sulfate being tested in the Standard Launderometer test procedure as indicated above. The following Table 2 presents these data:

*Table 2*

| Concentration of detergent composition in aqueous solution, percent by weight | 0.05 | 0.15 | 0.30 |
|---|---|---|---|
| Molecular weight of polyethylene glycol utilized in preparation of test sample of detergent | Detergency,[1] compared to Sodium-dodecylbenzene sulfonate-Na SO₄ composition | | |
| 146 | 62 | 65 | 61 |
| 200 | 73 | 77 | 70 |
| 800 | 96 | 98 | 93 |
| 1,000 | 101 | 104 | 103 |
| 1,540 | 117 | 119 | 115 |
| 3,000 | 102 | 106 | 100 |
| 6,000 | 98 | 104 | 96 |

[1] See footnote to Table 1 of Example I.

I claim as my invention:

1. A bicycloheptylaryl ether of a polyalkylene glycol containing from 2 to 5 carbon atoms per alkylene group.

2. An alkylbicycloheptylaryl ether having the empirical structure:

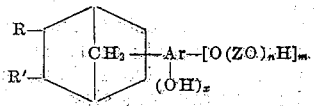

wherein Ar is a polyvalent aryl hydrocarbon nucleus, R and R' are selected from the group consisting of hydrogen and alkyl, not more than one of said R and R' groups being an alkyl radical containing not more than 12 carbon atoms per group and the other not more than 4 carbon atoms per group, Z is a divalent alkylene radical containing from 2 to 5 carbon atoms per group, $n$ is a whole number having a value of from 5 to 150, $m$ is a small whole number having a value of 1 to 2, and $x$ is a numeral having a value of from zero to $2-m$ when Ar is benzenoid and to $5-m$ when Ar is polycyclic.

3. The alkylbicycloheptylaryl ether of claim 2 further characterized in that Z is a divalent ethylene radical.

4. An ether as defined in claim 2 further characterized in that Ar is a phenyl nucleus.

5. A bicycloheptylaryl ether of a polyalkylene glycol containing from 2 to 5 carbon atoms per alkylene group, the aryl group of said ether being mono-nuclear.

6. An alkylbicycloheptylaryl ether of a polyalkylene glycol containing from 2 to 5 carbon atoms per alkylene group, the alkyl radical of said ether containing at least 3 carbon atoms.

7. An alkylbicycloheptylaryl ether of a polyalkylene glycol containing from 2 to 5 carbon atoms per alkylene group, the alkyl radical of said ether containing from 3 to 12 carbon atoms.

8. An alkylbicycloheptylaryl ether of a polyalkylene glycol containing from 2 to 5 carbon atoms per alkylene group, the alkyl radical of said ether containing from 6 to 9 carbon atoms.

9. An alkylbicycloheptylaryl ether having the empirical structure:

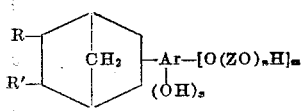

wherein Ar is a phenyl nucleus, R' is hydrogen, R is an alkyl group of not more than 12 carbon atoms, Z is a divalent alkylene radical containing from 2 to 5 carbon atoms per group, $n$ is a whole number having a value of from 5 to 150, $m$ is a small whole number having a value of 1 to 2, and $x$ is a numeral having a value of from zero to $2-m$.

10. A process for the production of a surface active agent which comprises alkylating an hydroxyaromatic compound containing a displaceable nuclear hydrogen atom with a bicyclo [2.2.1]-2-heptene alkylating agent at an alkylating temperature of from about —10° to about 300° C. and reacting the resulting alkylate at a temperature of from about 50° to about 150° C. with an oxyalkylene compound capable of producing a polyalkylene glycol ether on condensation with a phenolic hydroxyl group, the alkylene group of which contains from 2 to 5 carbon atoms per group.

11. The process of claim 10 further characterized in that said alkylating agent is an alkylbicyclo-[2.2.1]-2-heptene containing an alkyl group having at least 3 carbon atoms per alkyl group.

12. The process of claim 10 further characterized in that said hydroxyaromatic compound is phenol.

13. The process of claim 10 further characterized in that said hydroxyaromatic compound is a cresol selected from the group consisting of ortho-, meta-, and para-cresol.

14. The process of claim 10 further characterized in that said oxyalkylene compound is a polyethylene glycol containing from 5 to 150 ethylene groups per glycol molecule.

15. The process of claim 10 further characterized in that said oxyalkylene compound is a polyethylene glycol having a molecular weight of from about 200 to about 4,000.

16. The process of claim 10, further characterized in that said oxyalkylene compound is a polyethylene glycol having a molecular weight of from about 300 to about 3000.

17. The process of claim 10 further characterized in that said oxyalkylene compound is ethylene oxide.

LOUIS SCHMERLING.

REFERENCES CITED

The following references are of record in the file of this patent:

UNITED STATES PATENTS

| Number | Name | Date |
| --- | --- | --- |
| 2,178,831 | Bruson | Nov. 7, 1939 |
| 2,428,235 | Marple et al. | Sept. 30, 1947 |
| 2,486,925 | Carroll | Nov. 1, 1949 |
| 2,524,086 | Schmerling | Oct. 3, 1950 |